(12) United States Patent
Lee et al.

(10) Patent No.: US 11,281,647 B2
(45) Date of Patent: Mar. 22, 2022

(54) FINE-GRAINED SCALABLE TIME-VERSIONING SUPPORT FOR LARGE-SCALE PROPERTY GRAPH DATABASES

(71) Applicant: International Business Machines Corporation, Armonk, NY (US)

(72) Inventors: Jinho Lee, Austin, TX (US); Toyotaro Suzumura, New York, NY (US); Ilie Gabriel Tanase, Cedar Park, TX (US); Warut Vijitbenjaronk, Branson, MO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 412 days.

(21) Appl. No.: 15/833,022

(22) Filed: Dec. 6, 2017

(65) Prior Publication Data
US 2019/0171736 A1 Jun. 6, 2019

(51) Int. Cl.
*G06F 16/22* (2019.01)
*G06F 16/23* (2019.01)
(Continued)

(52) U.S. Cl.
CPC ...... *G06F 16/2246* (2019.01); *G06F 16/2282* (2019.01); *G06F 16/2365* (2019.01); *G06F 16/24575* (2019.01); *G06F 16/9024* (2019.01)

(58) Field of Classification Search
None
See application file for complete search history.

(56) References Cited

U.S. PATENT DOCUMENTS 7,178,025 B2 * 2/2007 Scheldt ............... G06F 21/31
                                                      705/67
8,219,522 B2    7/2012 Johnston et al.
(Continued)

OTHER PUBLICATIONS

Dubey et al., "Weaver: a high-performance, transactional graph database based on refinable timestamps;" Proceedings of the VLDB Endowment, vol. 9, No. 11, Copyright 2016 VLDB Endowment 21508097/16/07 (Year: 2015).*

(Continued)

*Primary Examiner* — Ashish Thomas
*Assistant Examiner* — Mellissa M. Ohba
(74) *Attorney, Agent, or Firm* — Cantor Colburn LLP; Brian Welle (57) ABSTRACT

A fine-grained scalable time-versioning support for large-scale property graph databases includes receiving a request, wherein the request includes an entity identifier (ID) and reference time information, and searching entries of a first table using the entity ID as a first key. Matching an entry is performed corresponding to the first key in the first table, determining the entry is valid based at least in part on comparing the reference time information of the request with stored time information for the entry, and responsive to the determination, creating a second key, wherein the second key concatenates an ID associated with the entity ID with the reference time information of the request. Searching a (Continued)

second table is performed having entries based at least in part on the second key, and responsive to searching the second table, retrieving data associated with the second key.

18 Claims, 7 Drawing Sheets

(51) Int. Cl.
  *G06F 16/901* (2019.01)
  *G06F 16/2457* (2019.01)

(56) References Cited

U.S. PATENT DOCUMENTS

| | | | |
|---|---|---|---|
| 9,218,383 B2 | 12/2015 | Tan et al. | |
| 10,409,782 B2* | 9/2019 | Zhang | G06F 16/182 |
| 2003/0182310 A1* | 9/2003 | Charnock | G06Q 10/10 |
| 2006/0253418 A1* | 11/2006 | Charnock | G06F 16/34 |
| 2009/0171731 A1* | 7/2009 | Bobak | G06Q 10/06 705/7.23 |
| 2014/0136520 A1* | 5/2014 | Digana | G06F 16/245 707/722 |
| 2014/0324862 A1 | 10/2014 | Bingham et al. | |
| 2016/0094681 A1* | 3/2016 | Wu | G06F 16/211 709/203 |
| 2016/0253679 A1* | 9/2016 | Venkatraman | G06Q 30/0185 705/310 |
| 2016/0292304 A1* | 10/2016 | Kartha | G06N 5/027 |
| 2017/0364534 A1* | 12/2017 | Zhang | G06F 16/284 |
| 2018/0239796 A1* | 8/2018 | Song | G06F 16/9024 |

OTHER PUBLICATIONS

Shang et al., "Graph analytics through fine-grained parallelism;" SIGMOD'16, Jun. 26-Jul. 1, 2016, San Francisco, CA, USA; Proceedings of the 2016 International Conference on Management of Data (Year: 2016).*

Vijitbenjaronk et al., "Scalable Time-Versioning Support for Property Graph Databases;" 2017 IEEE International Conference on Big Data (BIGDATA) (Year: 2017).*

Anonymously; "A fine-grained method to track line level change history in Version Control Systems"; http://ip.com/IPCOM/000209489D; IP.com No. IPCOM000209489D, Aug. 8, 2011, 9 pages.

Anonymously; "Method to retrieve the expected historical version"; http://ip.com/IPCOM/000244781D;IP.com No. IPCOM000244781D,Jan. 15, 2016, 8 pages.

Anonymously; "Prevention of Detrimental System Modification through Version Control"; http://ip.com/IPCOM/000244842D; IP.com No. IPCOM000244842D, Jan. 21, 2016, 5 pages.

Anonymously; "Versioning Systems to Support Full and Incremental Data Set Updates"; http://ip.com/IPCOM/000230623D; IP.com No. IPCOM000230623D; Aug. 27, 2013, 16 pages.

Felber, P. et al.; "On the Support of Versioning in Distributed Key-Value Stores"; University of Neuchatel, Switzerland; first.last@unine.ch; 2013, 10 pages.

Fox, A. et al.; "Spatio-temporal Indexing in Non-relational Distributed Databases"; Commonwealth Computer Research, Inc., IEEE; 2013, 9 pages.

* cited by examiner

| Key | Value | |
|---|---|---|
| exid | vid | creation | deletion |
| John | 0x1 | 2002 | 2009 |
| Tom | 0x2 | 2017 | N/A |
| Bob | 0x3 | 2000 | 2018 |

| Key | Value | |
|---|---|---|
| vid | deletion | creation |
| 0x1 | 2002 | 1994 |
| 0x1 | 1994 | 1980 |
| ... | ... | ... |

| Key | Value | | |
|---|---|---|---|
| vid | pid | pvalue | written |
| 0x1 | age | 18 | 2016 |
| 0x1 | height | 7ft | 2011 |
| ... | ... | ... | ... |

| Key | | Value |
|---|---|---|
| vid | pid | overwritten | pvalue |
| 0x1 | age | 2016 | 16 |
| 0x1 | age | 2014 | 14 |
| 0x1 | height | 2011 | 4ft |
| ... | ... | ... | ... |

| Key | | Value | |
|---|---|---|---|
| src | tgt | eid | creation | deletion |
| 0x1 | 0x2 | 0x1004 | 2001 | inf |
| 0x1 | 0x2 | 0x1005 | 2003 | inf |
| ... | ... | ... | ... | ... |

| Key | | Value | |
|---|---|---|---|
| src | tgt | deletion | eid | creation |
| 0x1 | 0x2 | 1995 | 0x1000 | 1990 |
| 0x1 | 0x2 | 2000 | 0x1001 | 2000 |
| 0x1 | 0x2 | 2003 | 0x1002 | 1999 |
| ... | ... | ... | ... | ... |

FIG. 7

| | | |
|---|---|---|
| add_vertex(vname) | -> | add_vertex(vname, time) |
| find_vertex(vname) | -> | find_vertex(vname, time) |
| get_vertex_property(vname, pname) | -> | get_vertex_property(vname, pname, time) |
| set_vertex_property(vname, pname, value) | -> | set_vertex_property(vname, pname, pvalue, time) |
| open_graph(G) | -> | open_graph(G, time) |

FIG. 10

FINE-GRAINED SCALABLE TIME-VERSIONING SUPPORT FOR LARGE-SCALE PROPERTY GRAPH DATABASES

BACKGROUND

The present invention generally relates to database management, and more specifically, to fine-grained scalable time-versioning support for large-scale property graph databases.

In today's environment, databases and filesystems are used to organize and store large amounts of data. The database can be configured in a variety of ways to allow for access in a plurality of ways. Back-end databases are databases that are indirectly accessed by the user through an external application, instead of an application that is stored within the database itself.

As time progresses, the data stored in the databases and/or filesystems can become stale and no longer desirable to a vast number of users. However, some users may desire to access older data which require the databases to store more and more historical data, while simultaneously updating the new data. This can cause the databases to grow in size causing the access times for data to be impacted.

SUMMARY

Embodiments of the present invention are directed to a computer-implemented method for fine-grained scalable time-versioning support for large-scale property graph databases. A non-limiting example of the computer-implemented method includes receiving a request, wherein the request includes an entity identifier (ID) and reference time information, and searching one or more entries of a first table using the entity ID as a first key. The computer-implemented method also includes matching an entry corresponding to the first key in the first table, and determining the entry is valid based at least in part on comparing the reference time information of the request with stored time information for the one or more entries of the first table. The computer-implemented method includes responsive to the determination, creating a second key, wherein the second key concatenates an ID associated with the entity ID with the reference time information of the request, searching a second table having one or more entries based at least in part on the second key, and responsive to searching the second table, retrieving data associated with the second key.

Embodiments of the present invention are directed to a system for fine-grained scalable time-versioning support for large-scale property graph databases. A non-limiting example of the system includes a storage medium, the storage medium being coupled to a processor, a first table, wherein the first table stores key-value pairs for each entry of the first table, wherein the first table maps an external identifier with an internal identifier and includes stored information time for each entry, and a second table, wherein the second table stores key-value pairs for each entry of the second table, wherein a key of the key-value pairs concatenate identifiers associated with the first table with stored time information, wherein the stored time information includes a deletion time for each entry.

Embodiments of the invention are directed to a computer program product for fine-grained scalable time-versioning support for large-scale property graph databases, the computer program product comprising a computer readable storage medium having program instructions embodied therewith. The program instructions are executable by a processor to cause the processor to perform a method. A non-limiting example of the method includes receiving a request, wherein the request includes an entity identifier (ID) and reference time information, and searching one or more entries of a first table using the entity ID as a first key. The method also includes matching an entry corresponding to the first key in the first table, and determining the entry is valid based at least in part on comparing the reference time information of the request with stored time information for the one or more entries of the first table. The method includes responsive to the determination, creating a second key, wherein the second key concatenates an ID associated with the entity ID with the reference time information of the request, searching a second table having one or more entries based at least in part on the second key, and responsive to searching the second table, retrieving data associated with the second key.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
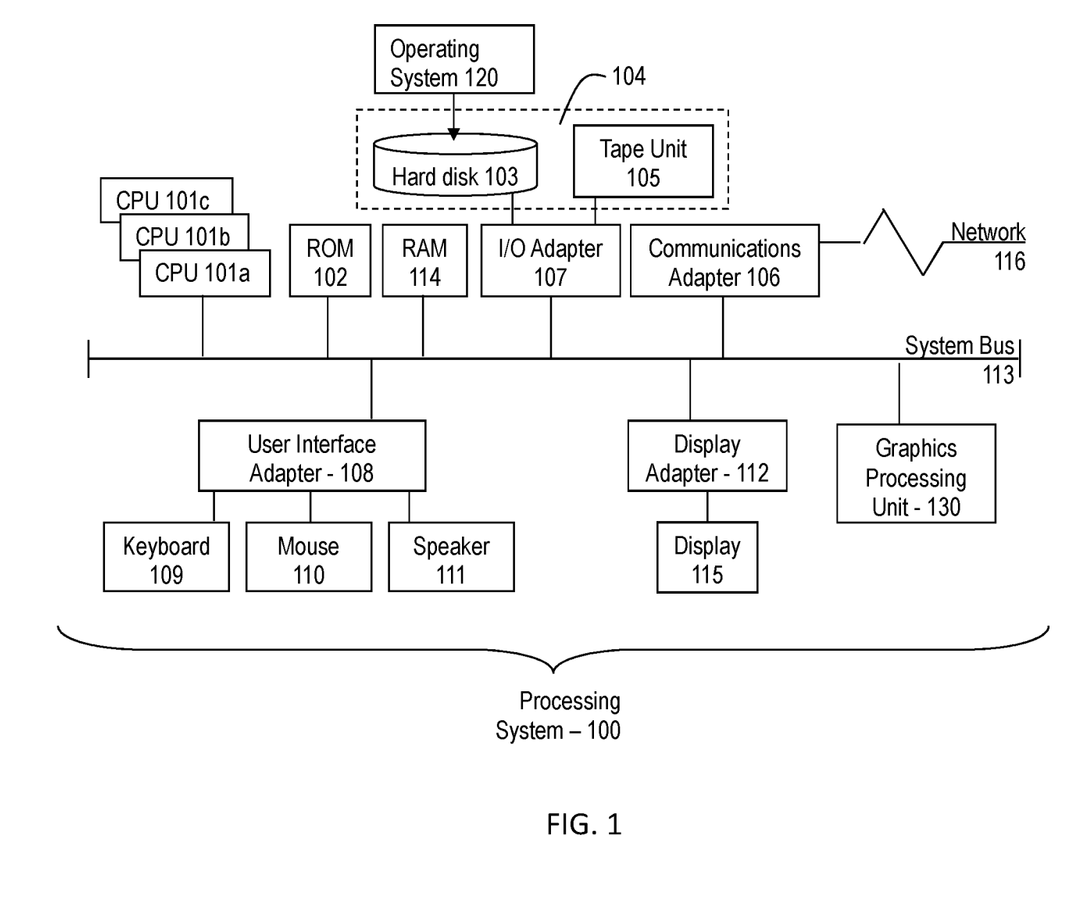
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable 110 buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super 110 chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

In one or more embodiments, the techniques can be implemented using one or more components from the system 100.

Turning now to an overview of technologies that are more specifically relevant to aspects of the invention, the data structure of a database can include an array, file, record, table, tree structure, among others. The data structure is a format for organizing and storing data to allow for indexing of the stored data. Traditionally, the data is stored in a database using key-value pairs where the <key> is used to map to a <value> storing the desired data.

Graphs are used to store data and relationships of the data. For example, graphs can be used to store the relationship information between banking transactions, social media entries, etc. A conventional database stores data in a key-value pair, where the key represents the entity ID and the value is the data associated with the key. The entity ID can correspond to a vertex, edge, or property of the graph. For example, the vertices can represent the users of a social media application and the edges can define the transaction between the vertices or the followers of social media users. In another example, the vertices can represent websites and the edges can represent the hyperlinks between the websites. Also, vertices can represent banking information where the edges represent the transactions between the items. The property data can describe any number of characteristics and/or attributes associated with the vertices and edges. It is to be understood that other data can be represented using the graphs and the examples are non-limiting in scope.

In one or more embodiments, b-tree structures can be used for the graphs because it supports exact matches, range matches, part key and pattern matches efficiently. The time taken to access a record remains constant because the same number of nodes is searched. The index is a full index so the data files are not required to be ordered.

Using the entity ID for searching the tree structure provides the ability to locate an entity in logarithmic time. As the graphs evolve over time and become larger, the techniques described herein provide a balance between storage space and performance time. In one or more embodiments, the database is configured with a current table and a history table. The current table is organized to include time information in the <value> to determine a valid time window for each of the latest entries and the history table is organized to include a portion of the time information in a <key> used to search for the entries so that a corresponding entry can be identified by the key, if such an entry exists.

In many scenarios, the most requested data is the latest data that has been stored or updated in the database. As more and more data is saved in the database, access times to older data increases due to the increased amount of data that must be searched. Different techniques exist which can be used to retrieve data, however, a balance between the storage space required and the access times must be considered.

A conventional method for storing and organizing databases include the snapshot method which where a snapshot of the current data in the database is taken at a periodic interval. The snapshot method unable to provide fine-grained access and requires the full restoration of the graph, even in situations where only a portion of the data is requested.

Another conventional method includes using a linked-list method which stores the delta between previous graphs and a current graph which is efficient for implementing updates to the database. However, as more and more entries are added growth explosion can occur where large amounts of historical data are stored and must be searched in order to locate older data. This method also requires complicated queries resulting in inefficient space and time management. For example, in the event a vertex of the graph changes multiple times, each vertex and each of the edges leading to the vertex have to be replicated to implement the change.

As the graph gets larger, the history gets larger and the performance of the graph can get compromised and slow down. For example, if a very old entry is to be accessed, the search for that data can be very time-consuming as each of the records leading up to the desired record needs to be searched.

Turning now to an overview of the aspects of the invention, one or more embodiments of the invention address the above-described shortcomings of the prior art by providing a technique that uses a most recently updated table and stored time information into the search tree for efficient data access. By incorporating the creation and expiration (deletion) time for the data in the stored time information, each entry for the entities is given a valid range in a current table. In other words, the most up-to-date or active data is stored in the current table. In an embodiment, the backend storage is stored in a tree-based structure. This allows a search to be performed using identifiers and the time in the search. Therefore, we don't need to know the exact time the value was stored. Following the tree, smallest value that is larger than the requested time stamp.

The above-described aspects of the invention address the shortcomings of the prior art by implementing a search in a first current table and if needed, a second history table using reference time information and the stored time information to store data. The stored time information is used as part of a key to index into the historical table. Because the tables are organized as trees, the search can be efficiently performed to locate an entry corresponding to a request, if such an entry exists.

Figure 2:
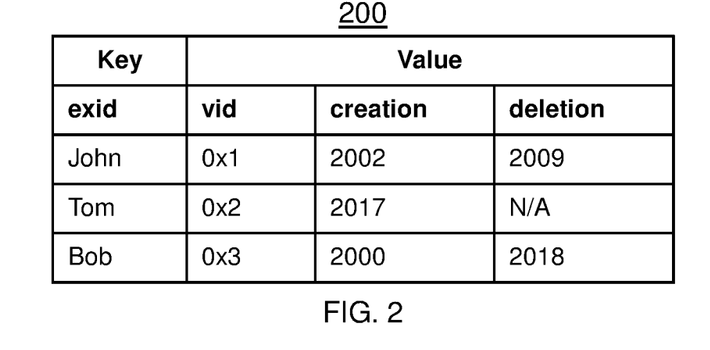
FIG. 2 depicts a current vertex table of a large-scale property graph database in accordance with one or more embodiments.

Turning now to a more detailed description of aspects of the present invention, FIG. 2 depicts a current vertex table 200 in accordance with one or more embodiments is shown. The current vertex table 200 stores data in a tree-structure using key-value pairs. The tree structure can include a b-tree structure or a k-d tree structure. B-trees are used in databases and filesystems when large blocks of data need to be read or written to memory. The b-tree structure stores data and allows searches, access, insertions, and deletions in logarithmic time by storing the data in the nodes and child nodes. The k-d tree structure is a space-partitioning data structure for organizing points in a multidimensional space. The k-d structure allows for performing searches using a multidimensional search key. It is to be understood that other structures can be used to store the data. In one or more embodiments, the current vertex table 200 is searched first.

In the current vertex table 200, the <key> stores an external ID (exid). In this non-limiting example, the external ID stores one or more names of users which can be represented as the vertices of a graph. The external ID includes the names John, Tom, Bob. The <value> of the current vertex table 200 stores an internal ID (vid), and stored time information. In one or more embodiments, the stored time information includes a creation time and a deletion time, wherein the creation time indicates when the entry was added or updated to the graph and the deletion time indicates an expiration time associated with the entry.

The current vertex table 200 creates a mapping between the external ID and the internal ID. For example, the external ID "John" is mapped to a value "0x1," "Tom" is mapped to the value "0x2," and "Bob" is mapped to the value "0x3." The internal ID is used to index into other tables as will be described below.

In addition, the creation time indicates when a particular entry was created and/or last updated or overwritten. The deletion time indicates when a particular entry is set to expire and/or has expired. By using the creation time and the deletion time a range can be created for a period in which a particular entry is considered "valid." In other words, the entry is considered active if the data associated with a received request falls within the time period between the creation time and the deletion time of the current vertex table 200.

Figure 3:
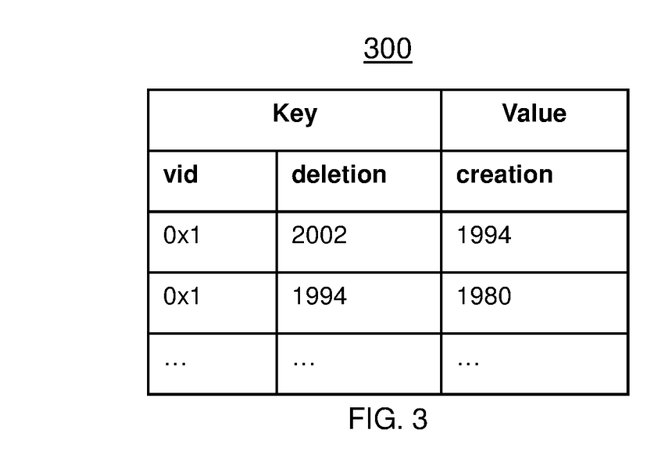
FIG. 3 depicts a vertex history table of a large-scale property graph database in accordance with one or more embodiments.

Requests for data falling outside of this range are considered stale and invalid. For example, according to the current vertex table 200, John has a valid entry between 2002 and 2009. However, requests seeking data related to John that fall outside of the 2002-2009 range will have to be searched in a vertex history table 300 as shown in FIG. 3. Similarly, Tom has a valid entry created after 2017 and has no deletion time. Bob has a valid entry between 2000 and 2018. Although the stored time information is shown in years, it is to be understood that any other format of time can be used such as day, month, year, time of day, and any other combination thereof. FIG. 3. In one or more embodiments, the current vertex table 200 is searched prior to the vertex history table 300.

Referring now to FIG. 3, a vertex history table 300 in accordance with one or more embodiments is shown. The vertex history table 300 stores all previously stored data associated with each vertex and each iteration of updates for each vertex. In one or more embodiments, if the request does not find the corresponding data in the current table, the history table is searched. In one or more embodiments, any updates or re-writes in this system must occur after the latest time presented in the current table 200. The entries of the vertex history table 300 are organized using key-value pairs. The <key> for each entry is created by concatenating the internal ID from the current vertex table 200 with the deletion time of that entry. The <key> allows a search to be performed in the vertex history table 300 based on the deletion time. For example, if a request includes a time period after the deletion time, the particular entries do not have to be considered in the search. The <value> for each entry is the creation time of the vertex of the current vertex history table 200. In the event an entry is found, and the <value> occurs after the time included in the request, a valid entry does not exist in the vertex history table 300 and the search can be stopped.

As an entry is updated and/or written to the current vertex table 200, the update is reflected in the current vertex table 200 and the previous entry is moved and stored in the vertex history table 300 as it is phased out.

For example, the keys of the key-value pair of the vertex history table 300 are the <vid, deletion time>. This format allows the system to efficiently match the vid. The vertex history table 300. After the vid has been matched, the deletion time of the key is compared with the reference time information of the request. The entry associated with the smallest deletion time of the key occurring after the reference time information of the request is returned, if such an entry exists. In the event the creation time of the entry occurs after the reference time information of the request, the entry will be invalid.

Figure 4:
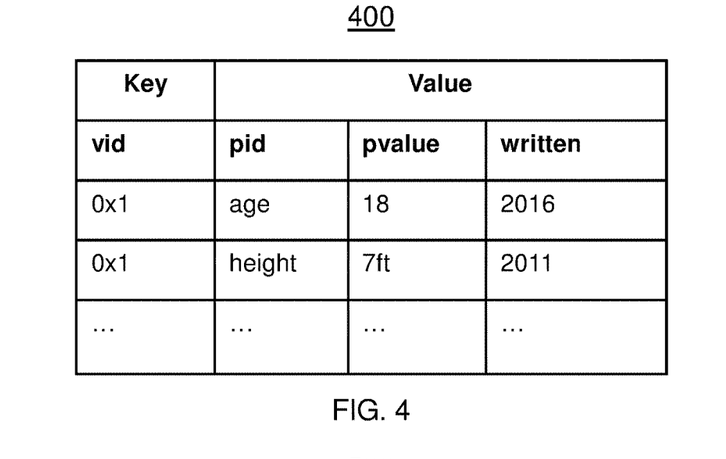
FIG. 4 depicts a current property table of a large-scale property graph database in accordance with one or more embodiments.

Now referring to FIG. 4, a current property table 400 in accordance with one or more embodiments is shown. The current property table 400 can store information such as names, weight, height, etc. It is to be understood that any type of data can be stored in the property table that are associated with the edges and vertices of the graph, such as attributes and characteristic information.

The <key> for the current property table 400 includes the internal from the current vertex table 200 and the <value> includes a property ID (pid), property value (pvalue), and a written value. The written value indicates when the entry was added to the table. A search according to a request uses the internal ID obtained from the vertex history table 200 to perform the search in the current property table 400. For example, the current property table 400 includes a <key> 0x1 which is associated with John as shown in table 200. The property ID associated with John describes John's age and height information where the respective property values are 18 years old and 7 feet. The stored time information for the current property table 400 includes a written date, also known as a creation date. The written date for the first entry is 2016 and the date for the second entry is 2011.

Figure 5:
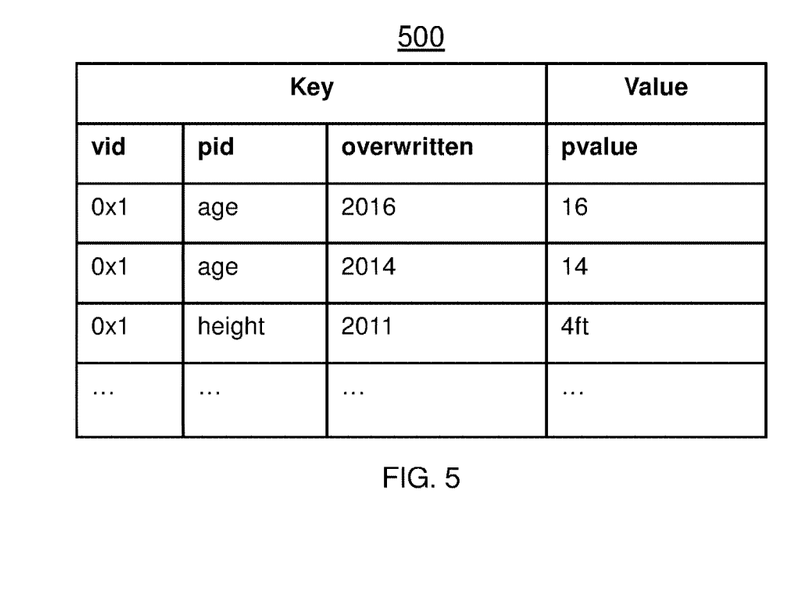
FIG. 5 depicts a property history table of a large-scale property graph database in accordance with one or more embodiments.

Now referring to FIG. 5, a property history table 500 is shown. In one or more embodiments, if the request does not find the corresponding data in the current table, the history table is searched. In a non-limiting example, the portion of the property history table 500 that is shown is associated with John. It is to be understood that other entries can be included in the property history table 500. The <key> for the property history table 500 includes <vid, pid, overwritten> and the <value> includes the <pvalue>. The configuration of the <key> allows a tree search to be performed efficiently by comparing the time information to the time information of the request. The property history table 500 includes historical data that has been updated and/or overwritten.

As shown in FIG. 5, the property history table 500 includes one or more past entries for each property. For example, the first and second entries are associated with the property of John's age having pvalues 16 and 14, respectively. The third entry is associated with a property of John's height having a pvalue of 4 ft.

Figure 6:
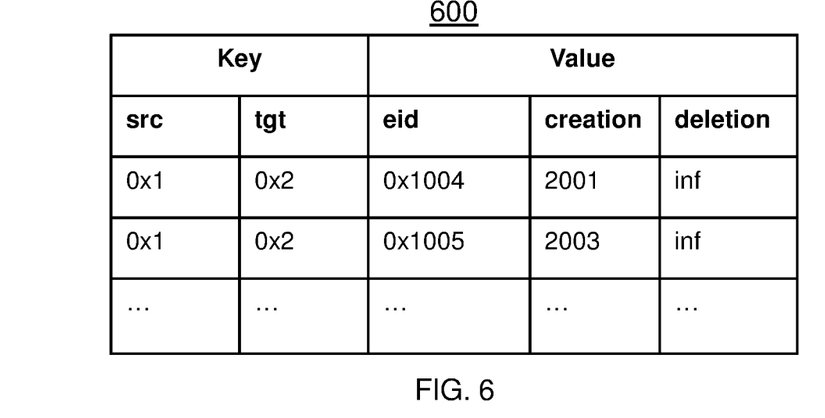
FIG. 6 depicts a current edge table of a large-scale property graph database in accordance with one or more embodiments.

Now referring to FIG. 6, a current edge table 600 in accordance with one or more embodiments is shown. The <key> used to organize the current edge table 600 includes the source vertex and target vertex pair <src, tgt>. In one or more embodiments, the source indicates a source vertex and the target indicates a target vertex where the source-target pair describes a particular edge between the source and a target vertex. The <value> includes the <eid, creation, deletion>, wherein the eid describes the edge ID, and the creation time and the deletion time. In one or more embodiments, no two edges share the same edge ID.

Figure 7:
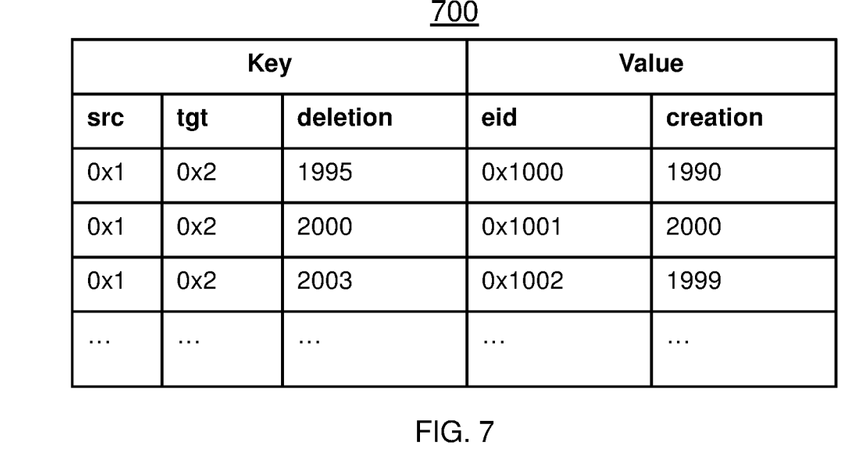
FIG. 7 depicts an edge history table of a large-scale property graph database in accordance with one or more embodiments.

The example shown in FIG. 6 includes a first entry having a source vertex 0x1 corresponding to John and the target vertex 0x2 corresponding to Tom which defines an edge leading from John to Tom. The eid indicates 0x1004 having a creation time 2001 and deletion time of infinity inf. The second entry of the table 600 has a source vertex 0x1 and target vertex 0x2. The corresponding eid is 0x1005 and creation time 2003 and deletion time is infinity. In the event a request is received for a time period falling outside of the time range, the edge history table 700 is searched.

Referring now to FIG. 7, an edge history table 700 in accordance with one or more embodiments is shown. In one or more embodiments, when the request does not find a result in the current table the history table is searched. The <key> used to organize the edge history table 700 includes the <src, tgt, deletion> and the <value> includes the <eid, creation>.

In a non-limiting example, the portion of the edge history table 700 that is shown is associated with source vertex 0x1 and target vertex 0x2. The key for the table 700 also stores the deletion time associated with each entry to be used during a search. In one or more embodiments, the source vertex, target vertex, and deletion time are concatenated to form the key. For example, the key for the first entry of the edge history table 700 has a <key> of 0x1, 0x2, 1995. The reference time information of the request is compared to the deletion time of the <key> of the edge history table 700 to locate an entry corresponding to the request.

In some embodiments, the current tables for the vertex, edge, property tables are part of the same table and the history tables are part of the same table. In some embodiments, the current tables are separate from one another and the history tables are separate from one another.

Figure 8:
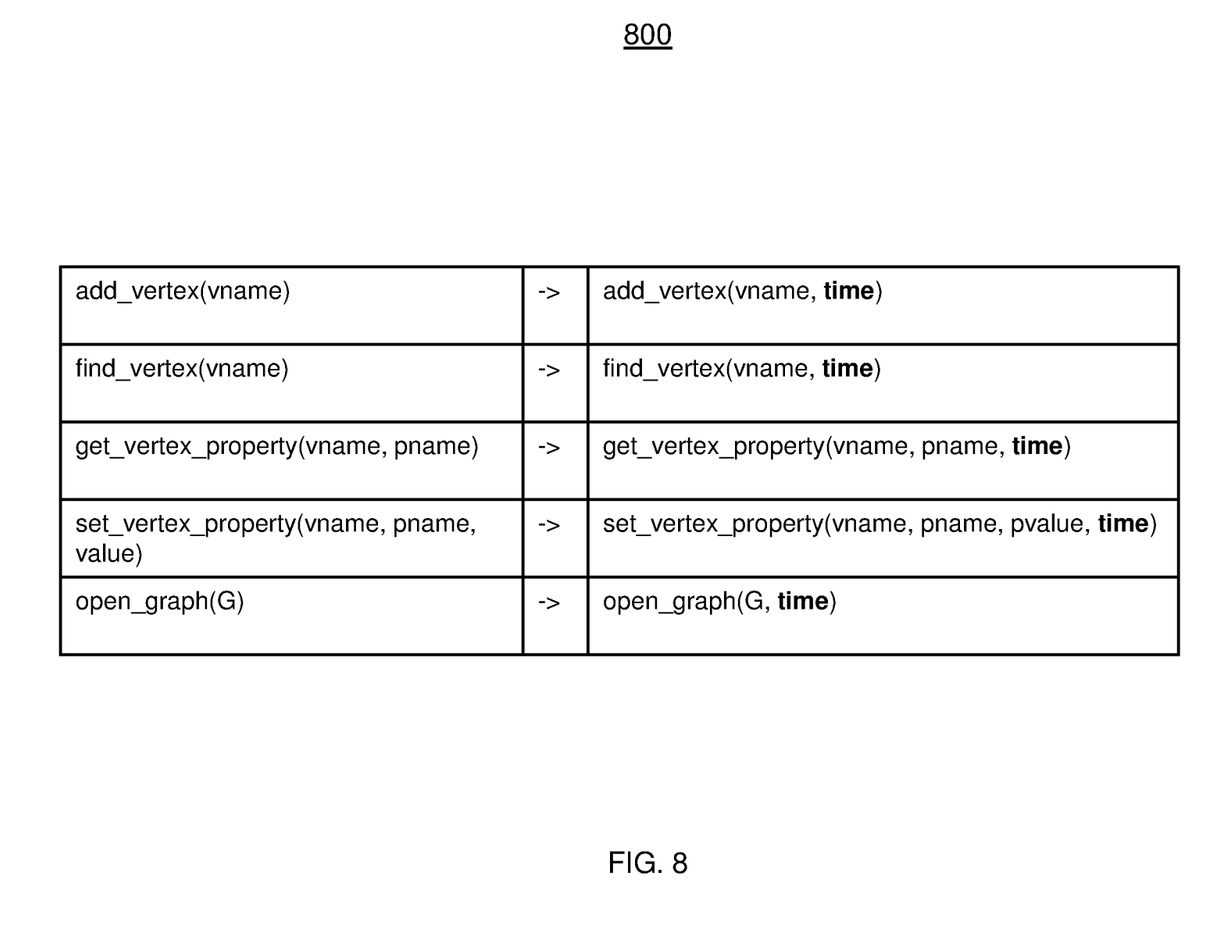
FIG. 8 depicts a table including requests for providing fine-grained scalable time-versioning support for large-scale property graph databases.

Referring now to FIG. 8, a set of requests 800 that are used in the system is shown. FIG. 8 provides non-limiting examples of requests used to retrieve data from the graph database. The requests in FIG. 8 have been modified to include a "time" parameter in the request. The "time" parameter of the request corresponds to the reference time information discussed above and is compared to the stored time information and keys to determine a corresponding entry. The "time" parameter can be arbitrarily selected by a user and is not restricted to predetermined increments.

The request to add a vertex to the graph database "add_vertex(vname)" is modified to "add_vertex(vname, time)" where vname represents the vertex name. The request to find a particular vertex of the graph database "find_vertex (vname)" is modified to "find_vertex(vname, time)." The request to retrieve a vertex property "get_vertex property (vname, pname)" has been modified to "get_vertex property (vname, pname, time)" where pname represents the property name. Similarly, the request "set_vertex property(vname, pname, pvalue)" is modified to "set_vertex property(vname, pname, pvalue, time)" where pvalue represents the property value. The "open_graph (G)" request is modified to "open_graph(G, time) where G represents a graph name or identifier. It is to be understood that other requests/commands can be used in the system to access data stored in the graph database.

Figure 9:
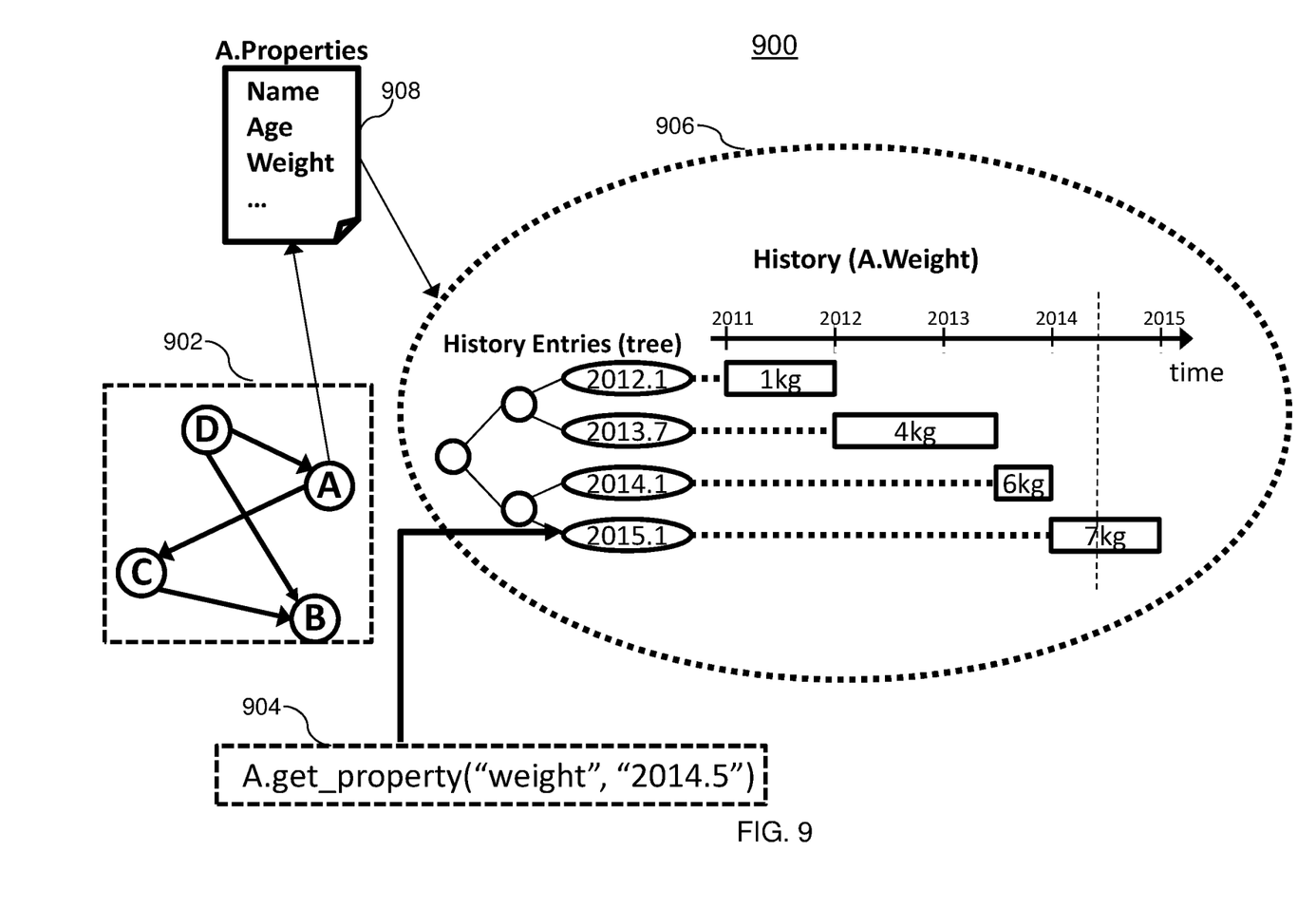
FIG. 9 depicts an implementation of fine-grained scalable time-versioning support for large-scale property graph databases accordance with one or more embodiments.

Now referring to FIG. 9, a non-limiting example for executing a "get_property" request is shown. The graph of FIG. 9 shows the vertices and edges between the vertices A, B, C, and D. In this non-limiting example, a request for vertex A is received. The properties 908 stored in the graph 902 for each vertex includes names, ages, weight, etc. The request, A.get_property("weight", "2014.5") 904, searches for A's weight information from May of 2014 (2014.5).

A portion of the property history graph 906 provides entries that were stored in 2012.1 having a valid entry between 2011 and 2012, 2013.7 having a valid entry between 2012 and 2013, 2014.1 having a valid entry between 2013 and 2014, and 2015.1 having a valid entry between 2014 and 2015.

After performing a search down the property history graph 902 which is organized using the deletion/death times for each entry, A's weight property value of 7 kg is returned to the requester because the entry associated with 2015.1 is the smallest duration after the reference time information of the request 2014.5.

In another non-limiting example, data for multiple users is stored in a database. The data includes information such as users' names, age, weight, etc. A request is received requesting weight information for a USER A from 1998. By using these techniques described herein, a query can include an arbitrary time period for the requested data and is not limited to time periods set at an established interval.

The database is configured with a first table and a second table, where the first table is a current table storing the latest information for each of the entries and the second table is a history table storing all previous entries for each of the entries.

The external identifier USER A is used to index into the current table. Subsequently, the time information of the request is compared to the stored time information for each record. In some embodiments, the stored time information for each record includes a creation time and a deletion time. The creation time and deletion time create a "valid" range for the most recent entries. For example, if the time information of the request occurs prior to the creation time or after the deletion time, the entry is outside of the range and determined to be invalid. If the reference time information of the request is within the range, then the entry is deemed valid and returned to the user.

In the event reference time information of the request falls outside of the range, the internal ID is taken from the first table and used to perform a search in a second table (history table). In addition to using the internal ID, a deletion time is used in combination with the internal ID to locate the desired information. For example, when the request is looking for an entry associated with 1998, a table is searched according to the internal ID and deletion time information associated with the entry. If the deletion time information in the key portion of the subsequent table is smaller than that of the request the search is continued. After searching the second table, the entry corresponding to the deletion time information that is adjacent to the request is retrieved, if such an entry exists. In particular, the smallest deletion time for an entry that is past the reference time information of the request is returned as the result.

Figure 10:
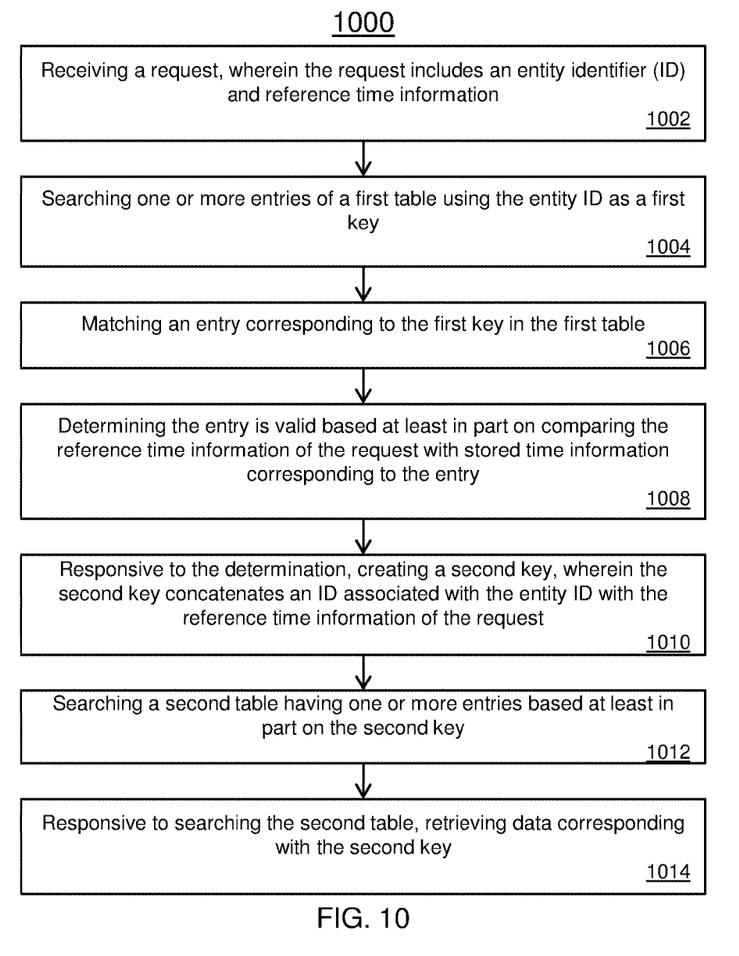
FIG. 10 depicts a flow chart for providing fine-grained scalable time-versioning support for large-scale property graph databases.

Now referring to FIG. 10, a flow chart illustrating a method 1000 for fine-grained scalable time-versioning support for graph databases is shown. Block 1002 provides receiving a request, wherein the request includes an entity identifier (ID) and reference time information. In one or more embodiments, the request is a user request to access information from a back-end database/server, where the request includes an identifier of the information to be accessed and the reference time indicates the time at which the data was stored in the database/server. In one or more embodiments, the request is to obtain social media data, banking transaction, website information, etc.

Block 1004 provides searching one or more entries of a first table using the entity ID as a first key. In some embodiments, the first table is a current table which stores a single version of the most recent information associated with each record. The first ID is a vertex ID, property ID, and/or source and target pair (edge ID).

Block 1006 provides matching an entry corresponding to the first key in the first table. In some embodiments, the current table is configured using key-value pairs, where the first ID is used to index into the current table to obtain the value associated with the key.

Block 1008 provides determining the entry is valid based at least in part on comparing the reference time information of the request with stored time information for the one or more entries of the first table. In some embodiments, the stored time information includes a creation time and a deletion time which creates a valid window for each entry. In one or more embodiments, a valid entry in the current table is determined by determining the reference time information of the request falls within the range of the stored time information in the current table. If a valid entry is determined, it is returned to the requesting user. If a valid entry is not determined, the processing continues to block 1010.

Block 1010 provides responsive to the determination, creating a second key, wherein the second key concatenates an ID associated with the entity ID with the reference time information of the request. In one or more embodiments, the second table is a history table which stores the previous versions of data stored in the current table which is organized using key-value pairs. For example, the second table can be a vertex table, a property table, or an edge table. The second key is a concatenated key which is created by concatenating an ID associated with the request with the reference time information of the request and is used to search the second history table.

Block 1012 provides searching a second table having one or more entries based at least in part on the second key. In one or more embodiments, the keys of the key-value pairs of the history table concatenate an ID associated obtained from the first table with a deletion time or written/overwritten time for each entry of the history table.

Block 1014 provides responsive to searching the second table, retrieving data associated with the second key. In one or more embodiments, the retrieved data is transmitted to a requesting user. In one or more embodiments, the concatenated keys used to index into the second table are compared to the keys of the second table. If the deletion time or the overwritten time of a portion of one or more keys in the second table occurs after the reference time information of the concatenated key, the entry having the smallest time after the reference time of the concatenated key is selected and returned to the user. In the event, the deletion time of the key for a particular entry occurs prior to the reference time of the concatenated key, then it can be determined that there is no matching entry for the request in the second table.

One or more embodiments improve over the prior art by decreasing the delay and latency associated with search times to obtain data associated with a request. The techniques described herein provide a granular technique for searching graphs without incurring an excessive delay. Users can request data for arbitrary time periods and are not restricted to predetermined time periods of the update times for the database which allows for a fine grained search. In addition, the techniques described herein avoid the need to restore an entire graph when only a portion of the graph is needed to fulfill a user's request.

One or more techniques provided balance the space used for storing data with the time required for searching as the graphs size increases. In addition, this technique is able to maintain the search performance for the latest data by maintaining separate graphs for the current data and the historical data. The graph sizes are also scalable as the graph grows and the historical data increases due to the tree based data structure. The performance of the current graph is not impacted with the increase in graph size.

In one or more embodiments, the efficient access and retrieval of data can minimize the transaction time and the utilization of a processor/controller to access the data. Processors and controllers can be freed up to attend to other critical tasks. In addition, requests transmitted over the network can be efficiently fulfilled to reduce transaction time for users, clients, and/or customers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for fine-grained scalable time-versioning support for a graph database, comprising:
   receiving a request, wherein the request includes an entity identifier (ID) and reference time information;
   searching one or more entries of a first table using the entity ID as a first key;
   matching an entry corresponding to the first key in the first table;
   determining the entry is valid based at least in part on comparing the reference time information of the request with stored time information for the one or more entries of the first table, wherein the stored time information includes a creation time and a deletion time for each of the one or more entries, wherein the creation time indicates when each of the one or more entries is created, updated, or overwritten, and wherein the deletion time indicates when each of the one or more entries is set to expire, wherein the entry is determined invalid if the stored time information for the one or more entries are outside of a range between the creation time and the deletion, wherein the invalid entries are not searched in the first table;
   responsive to the determination, creating a second key, wherein the second key concatenates an ID associated with the entity ID with the reference time information of the request;
   using the second key to search a second table having one or more entries based at least in part on the second key; and
   responsive to searching the second table, retrieving data associated with the second key.

2. The computer-implemented method of claim 1, wherein the second table concatenates the ID associated with the entity ID of the request with the deletion time of the one or more entries of the second table as keys.

3. The method of claim 1, wherein searching the second table includes comparing the second key with a key for an entry of the second table;
   identifying the entry of the second table having a smallest deletion time of the key later than the reference time information of the second key; and
   returning data associated with the entry to a user.

4. The computer-implemented method of claim 1, wherein the first table includes at least one of a current vertex table, current property table, or current edge table, wherein values of key-value pairs for the current vertex table include an internal ID and stored time information; wherein values of key-value pairs for the current property table include property values and stored time information; and wherein values of key-value pairs for the current edge table include an edge ID and stored time information.

5. The computer-implemented method of claim 1, wherein the second table includes at least one of a vertex history table, an edge history table, or property history table.

6. The computer-implemented method of claim 5, wherein keys of key-value pairs for the vertex history table concatenate an internal ID and a deletion time for each entry; wherein keys of key-value pairs for the edge history table concatenate a source ID, target ID, and a deletion time for each entry; and wherein keys of key-value pairs for the property history table concatenate a property ID and a deletion time for each entry.

7. The computer-implemented method of claim 1, wherein the first table is a current table and the second table is a history table.

8. The computer-implemented method of claim 1, wherein a structure of the graph database is one of a b-tree structure or a KD-tree structure.

9. The computer-implemented method of claim 1, responsive to updating an entry in the first table, storing the entry in the second table and updating the entry in the first table.

10. A computer program product for providing fine-grained scalable time-versioning support for property graph databases, the computer program product comprising:
a computer readable storage medium having stored thereon program instructions executable by a processor to cause the processor to:
receive a request, wherein the request includes an entity identifier (ID) and reference time information;
search one or more entries of a first table using the entity ID as a first key;
match an entry corresponding to the first key in the first table;
determine the entry is valid based at least in part on comparing the reference time information of the request with stored time information for the entry, wherein the stored time information includes a creation time and a deletion time for each of the one or more entries, wherein the creation time indicates when each of the one or more entries is created, updated, or overwritten, and wherein the deletion time indicates when each of the one or more entries is set to expire, wherein the entry is determined invalid if the stored time information for the one or more entries are outside of a range between the creation time and the deletion, wherein the invalid entries are not searched in the first table;
responsive to the determination that the entry is valid, create a second key, wherein the second key concatenates an ID associated with the entity ID with the reference time information of the request;
using the second key to search a second table having one or more entries based at least in part on the second key; and
responsive to searching the second table, retrieve data associated with the second key.

11. The computer program product of claim 10, wherein the second table concatenates the ID associated with the entity ID of the request with the deletion time of the one or more entries of the second table as keys.

12. The computer program product of claim 10, wherein searching the second table includes comparing the second key with a key for an entry of the second table;
identifying the entry of the second table having a smallest deletion time of the key later than the reference time information of the second key; and
returning data associated with the entry to a user.

13. The computer program product of claim 10, wherein the first table include at least one of a current vertex table, current property table, or current edge table, wherein values of key-value pairs for the current vertex table include an internal ID and stored time information; wherein values of key-value pairs for the current property table include property values and stored time information; and wherein values of key-value pairs for the current edge table include an edge ID and stored time information.

14. The computer program product of claim 13, wherein keys of key-value pairs for the vertex history table concatenate an internal ID and a deletion time for each entry; wherein keys of key-value pairs for the edge history table concatenate a source ID, target ID, and a deletion time for each entry; and wherein keys of key-value pairs for the property history table concatenate a property ID and a deletion time for each entry.

15. The computer program product of claim 10, responsive to updating an entry in the first table, storing the entry in the second table and updating the entry in the first table.

16. A system comprising:
a storage medium, the storage medium being coupled to a processor;
a first table, wherein the first table stores key-value pairs for each entry of the first table, wherein the first table maps an external identifier with an internal identifier and includes stored information time for each entry, wherein the stored time information includes a creation time and a deletion time for each of the one or more entries, wherein the creation time indicates when each of the one or more entries is created, updated, or overwritten, and wherein the deletion time indicates when each of the one or more entries is set to expire, wherein the entry is determined invalid if the stored time information for the one or more entries are outside of a range between the creation time and the deletion, wherein the invalid entries are not searched in the first table; and
a second table, wherein the second table stores key-value pairs for each entry of the second table, wherein a key of the key-value pairs concatenate identifiers associated with the first table with stored time information, wherein the concatenated identifiers and the time information are used to search the second table.

17. The system of claim 16, wherein the first table includes at least one of a current vertex table, current property table, or current edge table, wherein values of key-value pairs for the current vertex table include an internal ID and stored time information;
wherein values of key-value pairs for the current property table include property values and stored time information; and wherein values of key-value pairs for the current edge table include an edge ID and stored time information.

18. The system of claim 17, wherein keys of key-value pairs for the vertex history table concatenate an internal ID and a deletion time for each entry; wherein keys of key-value pairs for the edge history table concatenate a source ID, target ID, and a deletion time for each entry; and wherein keys of key-value pairs for the property history table concatenate a property ID and a deletion time for each entry.

* * * * *